Figure 2:
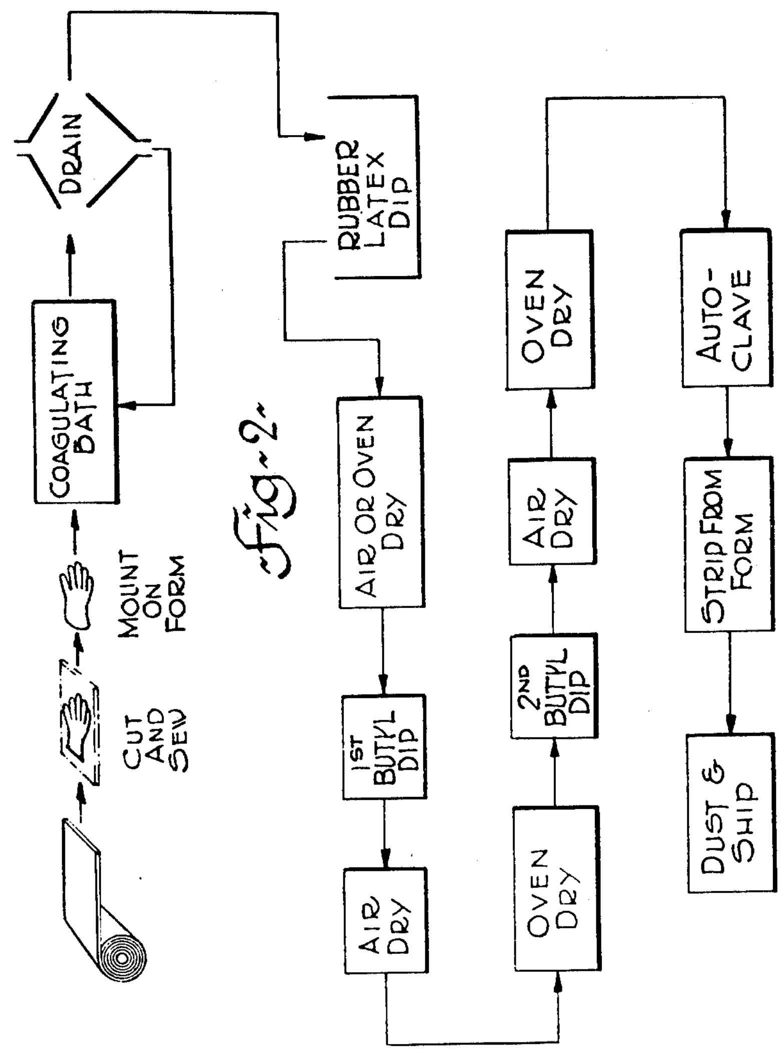

United States Patent [19]

Hart et al.

[11] 4,218,779

[45] Aug. 26, 1980

[54] CHEMICAL RESISTANT ARTICLE

[75] Inventors: John A. Hart, Kanata; John C. Collyer, Ottawa, both of Canada

[73] Assignee: Her Majesty the Queen in right of Canada, as represented by the Minister of National Defence, Ottawa, Canada

[21] Appl. No.: 947,702

[22] Filed: Sep. 29, 1978

Related U.S. Application Data

[62] Division of Ser. No. 881,533, Feb. 27, 1978.

[30] Foreign Application Priority Data

Dec. 8, 1977 [CA] Canada ............................ 292702/77

[51] Int. Cl.$^{2}$ ............................................ A41D 19/00

[52] U.S. Cl. ........................................................ 2/168

[58] Field of Search ............... 2/159, 161 R, 167, 168, 2/82, 81, 2.1 A, 164; 427/302, 303, 333, 381

[56] References Cited

U.S. PATENT DOCUMENTS

| | | | |
|---|---|---|---|
| 732,360 | 6/1903 | Lindsay | 2/168 |
| 1,769,977 | 7/1930 | Watkins | 2/168 |
| 1,955,840 | 4/1934 | Trobridge | 427/302 |
| 2,121,717 | 6/1938 | Sullivan | 427/302 |
| 2,135,151 | 11/1938 | Schur | 427/333 |
| 2,304,137 | 12/1942 | Peakes | 2/168 |
| 2,989,755 | 6/1961 | O'Brien et al. | 2/168 |
| 3,110,035 | 11/1963 | LaHue | 2/168 |
| 3,268,355 | 8/1966 | Brodeur | 2/167 |
| 3,337,876 | 8/1967 | Armstrong | 2/82 |
| 4,070,713 | 1/1978 | Stockum | 2/168 |

*Primary Examiner*—H. Hampton Hunter

*Attorney, Agent, or Firm*—Cushman, Darby & Cushman

[57] ABSTRACT

An article of clothing, particularly a glove, which is highly resistant to chemical warfare agents, comprising a fabric substrate, normally pre-shaped to form the article, which is coated with an inner layer of a resilient elastomer, such as natural rubber, deposited from a latex, which adheres to but does not penetrate the substrate, and then coated with an outer layer of a butyl rubber which may contain an inorganic filler. The fabric substrate provides wearer comfort while the combination of an inner layer having a high vapor retention capacity and an outer layer which is resistant to toxic chemicals in liquid form and has a low vapor permeability, provides a high resistance to toxic chemicals for periods of time not heretofore possible.

19 Claims, 2 Drawing Figures

CHEMICAL RESISTANT ARTICLE

This is a division of application Ser. No. 881,533 filed Feb. 27, 1978.

This invention relates to articles of clothing which are resistant to toxic chemicals. More particularly this invention relates to glove which are resistant to chemical warfare agents for 12 hours or more.

Many items of protective clothing, and in particular gloves, have been developed for military and industrial uses over the years in many parts of the world. Some of these provide adequate chemcial protection but are too thick and heavy to permit manipulation of small objects. In others, which are lighter and thinner, tactility and manual dexterity is obtained at the expense of chemical protection. Yet others, while providing good chemical protection for limited periods of time, of the order of two to three hours, deteriorate rapidly and become totally useless upon prolonged exposures of the order of 12 to 15 hours. Gloves are quite easily produced from natural rubber and chloroprene latices but these materials do not give adequate protection against CW agents. One of the few polymers that will give this protection is butyl rubber and its halogenated derivatives. It is known to fabricate gloves with a fabric liner and coated with natural rubber neoprene or butyl rubber and it is also known that the impermeability of butyl rubber to chemical agents and gases may be improved by the incorporation of a micaceous filler.

The prior art has, however, failed to contemplate that a multi-layered article of clothing comprising in combination an inner layer of a resilient elastomer having a high affinity for a toxic vapour and an outer layer of a butyl rubber being substantially impermeable to toxic liquid and having low vapour permeability, produces an improved, comfortable, flexible glove which provides protection against chemical warfare agents for a period of time almost an order of magnitude greater than heretofore possible. It is believed that there is a synergistic effect between the inner layer, preferably natural rubber or chloroprene, having a high vapour retention capacity, and the outer butyl rubber layer being substantially impermeable to a toxic liquid and having low vapour permeability, such that the protection afforded by the combination is far greater than the sum of the protection afforded by the parts. Butyl rubber and more particularly butyl rubber which incorporates a suitable inorganic filler is not swollen by chemical warfare agents, such as mustard gas, and does not absorb them in liquid form. It acts therefore as a barrier to these substances in liquid form. It also acts as a barrier to vapour and possesses a very high resistance to penetration by the vapours of chemical warfare agents. On the other hand, natural rubber and synthetic elastomers such as polyethyl acrylate, nitrile rubbers and neoprene have a greater affinity for chemical warfare agents such as mustard gas and are therefore unsuitable for use in the outer layer of a glove. When protected by an outer layer of the relatively impermeable butyl rubber, however, a layer of a material with a high affinity for CW agents tends to adsorb and retain the very small amounts of vapour which are transmitted by the relatively impermeable outer layer, and thus provides the wearer with greater protection than would otherwise be available.

Thus by one aspect of this invention there is provided a multi-layer article of clothing comprising in combination an inner layer of a resilient elastomer and an outer layer of a butyl rubber completely covering the inner layer, said inner layer having a high affinity for a toxic vapour, and said outer butyl rubber layer being substantially impermeable to a toxic liquid and having a low toxic vapour permeability, thereby providing high resistance to toxic chemicals.

By another aspect of this invention there is provided a method for producing an article of clothing which is resistant to chemical warfare agents comprising the steps of:

a. providing a former for said article of clothing;

b. coating said former with a latex rubber-coagulating agent;

c. dipping the coated former into a rubber latex dispersion and drying to produce a rubber coated former;

d. coating the rubber coated former with a butyl rubber;

e. drying said butyl rubber, and f. curing said rubber coating and said butyl rubber coating in situ at elevated temperature, wherein said rubber coating exhibits a high affinity for a toxic vapour and said butyl rubber coating is substantially impermeable to a toxic liquid and exhibits low toxic vapour permeability.

Figure 1:
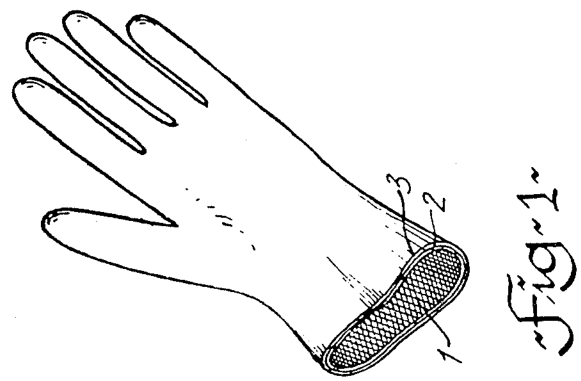

The invention will be described hereinunder with reference to the accompanying drawings in which FIG. 1 is a sketch of a glove according to the invention; and FIG. 2 is a schematic flow diagram of the method of production used for the glove of FIG. 1.

As shown in FIG. 1, a glove according to the present invention comprises a moisture absorbtive reinforcing substrate 1 covered with an inner layer 2 of a resilient elastomer having a high affinity for a toxic vapour, such as natural rubber or chloroprene, and an outer layer 3 of a butyl rubber being substantially impermeable to a toxic liquid and having a low vapour permeability. It will be appreciated that the reinforcing substrate is inessential to the invention and is only present in a preferred embodiment. The butyl rubber is preferably chloro-butyl rubber or bromo-butyl rubber and contains a suitable inorganic filler. A suitable inorganic filler is magnesium silicate.

The substrate may be any suitable fabric liner material known to those skilled in the art. Conveniently the fabric liner is a knitted cotton fabric which has an interlocked structure which provides stretch in two directions. Such fabrics provide maximum comfort to the wearer, are reasonably perspiration absorbent and facilitate donning and doffing.

For maximum flexibility of the finished product it is important that the inner resilient elastomeric layer should adhere to the liner or substrate but should not impregnate or strike through the fabric. The cotton liner is, therefore, mounted on a former and is first soaked with a rubber latex-coagulant agent, which will gel or coagulate the elastomeric latex before it penetrates the fabric. Conveniently, a 10% solution of acetic acid in methanol is used as the coagulant.

The inner elastomeric layer is normally formed on the coagulant soaked substrate by coating with a suitable latex dispersion, for example, natural latex, such as Lotol 185 ®, having a 61% solid content and a viscosity of at least 800 centipoise. Latexes of other elastomeric materials such as polyacrylates e.g. polyethyl acrylate (Hycar ®), polybutadiene, styrene-butadiene copolymer, acrylonitrile-butadiene rubber and neoprene (polychloroprene) may also be employed for this purpose.

The other layer is produced by coating the previously latex-coated glove with a butyl rubber of suitable composition. The coating is preferably effected from a solution of the butyl rubber composition in a suitable volatile organic solvent or from a latex dispersion of the butyl rubber composition in water. The latex method is preferred because of problems encountered in the handling of solvent vapour. Also, in industrial operations with solutions of butyl rubber the complete removal of trapped solvent from the coating and subsequent vulcanization without the formation of blisters in the finished article have been difficult.

Preferably, but not essentially, the outer butyl rubber layer is produced by successive coatings with intermediate air drying steps so as to build up a composite butyl rubber layer and hence avoid flaws and bubbles which might expose the inner layer directly to a toxic chemical.

Butyl rubber has also given problems in attaining a high level of cross linking during vulcanization i.e. curing, giving rubber compounds which have low resiliency, high set and generally a dead or non-rubbery feel. The newer additions to the butyl family of rubbers, i.e. chlorobutyl and bromobutyl, have given more cure-reactive polymers and consequently more resilient rubbers. Bromobutyl rubber being more reactive than chlorobutyl rubber gives slightly faster and tighter cures than do chlorobutyl-rubber compounds with similar vulcanization systems.

The halogenation of the isobutylene-isoprene copolymer (butyl rubber) is controlled to give a predominant substitution reaction and little of the unsaturation originally present in the molecule is lost. This gives a polymer chain with one halide atom to one double bond.

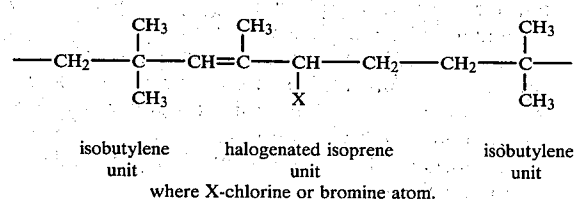

where X-chlorine or bromine atom.

Besides supplying additional sites for cross linking with metal oxides the halogen enhances the reactivity of the double bond. Thus, bromobutyl and chlorobutyl rubbers were selected for preparation and evaluation. The butyl rubber solution preferably contains an inorganic filler in an amount from about 5% to about 100% by weight of contained rubber, in addition to conventional curing agents, accelerators, softeners, antioxidants, pigments and the like, known of those in the art. If desired, the successive coatings may be of the same butyl rubber composition or alternatively the pigment constituent may be contained only in the final coating composition. The inorganic filler material preferably has a plate-like particle structure such as a micaceous material or flake aluminum. Powder talc is also suitable and a preferred material is Mistron® Vapour which is an ultra fine magnesium silicate. Any solvent commonly used in rubber technology may be employed e.g. xylene, as may any conventional pigments, antioxidants and the like. A suitable butyl rubber has been found to be Polysar® Bromo-Butyl X2.

With reference now to FIG. 2, which shows a schematic flow sheet of a preferred method according to the present invention, it will be seen that a conventional knitted or interlocked cotton fabric is cut to shape and sewn to form a cotton glove substrate which is then placed on hollow porcelain former having a glazed impermeable outer surface. The formers are carried on racks by conveyor through a coagulant agent bath containing 10% acetic acid in methanol. Upon removal from the bath the coagulant is allowed to drain for 2 to 4 minutes, the formers are turned and drained for a further 2 to 4 minutes to allow evaporation of the methanol. The treated substrates are then dipped in a bath containing natural latex dispersion (having 61% solids and a viscosity of at least 800 centipoise). The latex dipped gloves are then air dried for about 24 hours at ambient temperatures to produce a rubber coated former. Alternatively, the latex dipped gloves may be dried in an oven at temperatures up to about 150° F. for up to about 3 hours.

Following the solution method mentioned above, the natural rubber coated gloves are then dipped in a butyl rubber composition dissolved in a suitable volatile organic solvent e.g. xylene, and then air dried at room temperature for 2 to 4 hours depending upon temperature and humidity conditions. Following air drying, further drying in an oven at about 165° F. for about 1 hour is performed. Predrying at ambient temperature is a preferred but not essential step as blistering and bubbling problems and the risk of retaining pockets of the xylene solvent are minimized. The gloves are withdrawn from the butyl rubber coating bath at about 6 inches per minute and this is sufficient to build up a layer between 0.001 and 0.010 inches and generally about 0.006 inch on the substrate. Following oven drying and cooling the dipping and drying steps are repeated up to four or five times so as to build up sufficient thickness to provide the amount of CW agent protection required. The basic requirements of the gloves were to give at least 12 hours protection against mustard gas (H-agent, dichlorodiethylsulphide), to have as little effect as possible on manual dexterity, to withstand at least three weeks wear under combat conditions and to impose as little discomfort as possible on the wearer in hot or cold weather. Because these requirements were not compatible, a compromise was necessary in the choice of design and material. Normally a total thickness of up to about 0.030 inch is required and this is normally produced in four or five dipping and drying steps. For convenience and simplicity only two dipping and drying cycles are shown in FIG. 2. As previously indicated the pigment components of the dipping solution may be omitted if desired, from all but the last dipping stage. Following the final dip, drying, and cooling, the gloves are lightly dusted with a magnesium carbonate powder and cured at elevated temperature and pressure in an autoclave. Curing at about 27 psi of saturated steam at 127° C. (260° F.) for 2 hours has been found satisfactory although the pressure may be increased to about 50 psi with a corresponding reduction in curing time. Hot air may also be used instead of steam. The pressure cure of the autoclave permitted vulcanization of both the resilient natural rubber and the butyl rubber coating compositions, without any formation of bubbles or air blisters. Following curing, the gloves are stripped from the porcelain forms while hot and, when cool, are trimmed and washed in soapy water. A final dusting with zinc stearate powder facilitates packaging.

The preferred butyl rubber composition when using the solution method i.e. a solution of a butyl rubber composition in a suitable volatile organic solvent e.g. xylene, is as follows.

TABLE IA

| | PARTS BY DRY WEIGHT |
|---|---|
| a butly rubber (selected from butyl, bromobutyl and chlorobutyl) | 100 |
| zinc oxide | 3 to 8 |
| stearic acid | 0.1 to 2.0 |
| antioxidant (e.g. octamine) | 0.1 to 3.0 |
| Coumarone-indene resin | 0 to 15.0 |
| magnesium silicate filler | 0 to 100 |
| zinc diethyldithiocarbamate | 0.1 to 3.0 |

During the course of the development we were able to show that xylene was the preferred solvent for this application (Table I). Certain other solvents and azeotropic mixtures of solvents gave blisters during drying and vulcanizing.

TABLE I

The Effect of Various Solvent/Butyl-Rubber Mixtures on Blistering After Vulcanization

| | | | | Blistering | | |
|---|---|---|---|---|---|---|
| Solvent | Solvent Ratio % | Solubility | Viscosity (27% Solids) Pa s | After Drying at 70° C. (1 hr) | | After Curing at 120° C. (2 hr) |
| hexanes | 100 | soluble | 0.55 | medium | | severe |
| toluene | 100 | soluble | 1.70 | OK | | light |
| xylene | 100 | soluble | 1.95 | OK | None | V. light |
| naphtha | 100 | soluble | 0.80 | light | preferable | medium |
| acetone hexanes | 59/41 | insoluble | — | — | to O.K. | — |
| isopropanol/toluene | 69/31 | insoluble | — | — | | — |
| hexanes/n-propanol | 96/4 | soluble | 0.45 | medium | | severe |
| xylene/naphtha | 80/20 | soluble | 1.00 | OK | | V. light |
| hexanes/isopropanol | 95/5 | soluble | 0.85 | heavy | | severe |
| toluene/isopropanol | 95/5 | soluble | 1.36 | OK | | V. light |
| xylene/isopropanol | 95/5 | soluble | 1.15 | OK | | V. light |
| naphtha/isopropanol | 95/5 | soluble | 1.27 | heavy | | severe |
| M.E.K.(methylethylketone) | 100 | insoluble | — | — | | — |
| M.E.K./toluene | 50/50 | insoluble | — | — | | — |
| toluene/M.E.K. | 75/25 | insoluble | — | — | | — |
| toluene/M.E.K. | 95/5 | soluble | 1.55 | OK | | light |
| trichloroethylene | 100 | soluble | 20.02 | V. light | | severe |
| methylene chloride | 100 | insoluble | — | — | | — |
| 1,2-dichloroethane | 100 | insoluble | — | — | | — |

A final neoprene-rubber coating may be added to give increased abrasion resistance. Tests showed that vulcanized bromobutyl rubber had sufficient stability to abrasion and wear without any extra protective layer needed. Penetration tests showed the neoprene gave reduced times with H-agent as shown in Table II.

TABLE II

The Effect of Neoprene as an Abrasive. Resistant Outerlayer on Penetration of H

| Composition of Glove Coating Layers of: | | | Penetration Time, |
|---|---|---|---|
| Natural Rubber | Butyl Rubber | Neoprene | (h) |
| 1 | 4 | 1 | 6.5 |
| 1 | 4 | — | 10.0 |
| 1 | 5 | — | >12 |

The above method of fabrication used butyl rubber compositions containing a large proportion of ultra-fine magnesium silicate (Table III). This material, which has a platy micaceous structure gave improved i.e. lower penetration times on the Congo red mirror test with H-agent, Table IV (which is a comparison of two formulations differing only in the presence and absence, respectively, of the filler). The actual butyl-rubber formulations used which are presented in Table III include a chlorobutyl- and bromobutyl-rubber compound, CF 266 and CF 268, which are compared in Table V for penetration with H-agent. Only very slight differences in times were noted and these could be due to the small difference in thickness of the samples. When compared with a commercially available neoprene-rubber latex however, a definite superiority of butyl rubber can be seen.

TABLE III

Butyl-Rubber Formulations

| | CF 266 | CF 267 | CF 268 | CF 269 |
|---|---|---|---|---|
| Chlorobutyl Rubber | 100.00 | — | — | — |
| Bromobutyl Rubber | — | 100.00 | 100.00 | 100.00 |
| Zinc Oxide | 5.00 | 5.00 | 5.00 | 5.00 |
| Stearic Acid | — | 1.00 | 1.00 | 1.00 |
| Zinc Stearate | 1.50 | — | — | — |
| Activated Magnesium Oxide | 0.50 | 0.50 | — | — |
| Antioxidant (octamine) | 1.00 | 1.00 | 1.00 | 1.00 |
| Ceumarone-indene Resin (Cumar ®) | 3.00 | 3.00 | 3.00 | 3.00 |
| Magnesium Silicate (Mistron ®) | 100.00 | 100.00 | 100.00 | — |
| Benzothiazole Disulphide | 2.00 | 2.00 | — | — |
| Tetramethyl Thiuram Disulphide | 1.00 | 1.00 | — | — |
| Zinc Diethyl Dithiocarbamate | — | — | 1.00 | 1.00 |
| Colour to Olive Drab | | | | |

All formulations dissolved in xylene

TABLE IV

Comparison of Mica-Filled (CF 268) with Non-Filled (CF 269) Bromobutyl Rubber Using Cell Penetration Test

| Compound | Thickness mm | Total H Collected μg (4h) | (7h) | (16h) | (23.8h) | (32h) |
|---|---|---|---|---|---|---|
| CF 268 | 0.15 | 88 | 670 | — | — | — |
| CF 269 | 0.15 | 2189 | — | — | — | — |
| CF 268 | 0.25 | 0 | 9 | 433 | — | — |
| CF 269 | 0.25 | 13 | 171 | 1241 | — | — |
| CF 268 | 0.36 | 0 | 0 | 44 | — | — |
| CF 269 | 0.36 | 0 | 0 | 126 | — | — |
| CF 268 | 0.48 | 0 | 0 | 73 | 124 | 151 |
| CF 269 | 0.48 | 0 | 0 | 109 | 417 | 838 |
| CF 268 | 0.64 | 0 | 0 | 0 | 0 | 0 |
| CF 269 | 0.64 | 0 | 0 | 0 | 0 | 54 |
| CF 268 | 0.81 | 0 | 0 | 0 | 0 | 0 |

TABLE IV-continued

| Comparison of Mica-Filled (CF 268) with Non-Filled (CF 269) Bromobutyl Rubber Using Cell Penetration Test | | | | | | |
|---|---|---|---|---|---|---|
| Com- | Thickness | Total H Collected μg | | | | |
| pound | mm | (4h) | (7h) | (16h) | (23.8h) | (32h) |
| CF 269 | 0.81 | 0 | 0 | 0 | 0 | 0 |

The improvement in penetration times exhibited by the formulations containing the filler is believed to be due to a tortuous path created by the presence of the filler.

TABLE V

| Comparison of Penetration Times of Chloro and Bromo-Butyl Rubber with Neoprene at Various Thickness | | |
|---|---|---|
| Type of Rubber | Thickness, mm | Penetration (h) |
| Chlorobutyl | 0.18 | 4.5 |
| Bromobutyl | 0.15 | 3.3 |
| Chlorobutyl | 0.25 | 10.0 |
| Bromobutyl | 0.23 | 7.0 |
| Chlorobutyl | 0.35 | 15.5 |
| Bromobutyl | 0.28 | 14.0 |
| Neoprene Latex | 0.56 | 1.5 |
| | 0.76 | 2.0 |

Improvements in penetration times noted with the solution-deposited bromobutyl rubber with additions of mica-type fillers were attempted with the natural-rubber latex dipping method. Due to critical pH and solids content of the natural-rubber latex we were not able to significantly change the penetration times without changing the nature of the dipping bath. The modified natural-rubber latex gave strike-through and film-buildup problems on the cotton substrate and did not allow suitable materials to be fabricated. Accordingly, the addition of the fillers using the latex disposition method was dropped.

Results of penetration tests carried out on the final materials used are presented in Table VI which clearly indicates the superiority of our natural rubber/butyl rubber combination over natural-rubber. H-agent penetration; Two methods of obtaining penetration data were used.

a. The congo red mirror method i.e. MIL STD 282 Method 204.1.1 was employed to give time of penetration of H-agent and;

b. the H-agent vapour which penetrated a sample of material clamped in the conventional penetration test cell was swept by a stream of air into an absorption bubbler containing diethyl succinnate, and the amount of H-agent vapour collected therein was determined by the gas chromatographic method of Gibson et al. in Journal of Chromatography Vol. 92 (1974) p.p. 162 to 165.

TABLE VI

| Test were carried out at a temperature of 30° C. and the test material was contaminated with five one milligram drops of H-agent Penetration Results of Natural-Rubber and A Natural-Rubber/Butyl-Rubber Laminate (Glove Material) | | | | | | |
|---|---|---|---|---|---|---|
| | Thickness | Total H Collected, μg | | | | |
| Composition | mm | 4 h | 7 h | 16 h | 23.8 h | 32 h |
| Natural Rubber | 0.48 | 8963 | — | — | — | — |
| Natural Rubber | 0.48 | | | | | |
| | | 0 | 0 | 0 | 0 | 24.5 |
| Butyl Rubber | 0.28 | | | | | |

The alternative method mentioned above for applying the butyl rubber coating involves latex dipping. The advantages of latex dipping over solution dipping in rubber glove manufacture are numerous. The use of flammable, toxic solvents and long drying periods makes solution dipping unpopular as does difficulties in vulcanization or curing of the deposited layer.

Latex dipping on the other hand is relatively simple, less hazardous and less costly. Removal of water requires less equipment than the solvents used in solution dipping and is a much safer process (fire, toxicity and pressure curing). Moreover, a glove can be produced in a shorter time using a latex system rather than with a solvent system.

The latex dipping method is essentially the same as the solution dipping method, with the exception that the butyl rubber coating composition is applied in the form of a latex dispersion of the butyl rubber composition in water.

The preferred butyl rubber composition for use in forming the latex dispersion is as follows:

TABLE VII A

| | PARTS BY DRY WEIGHT |
|---|---|
| Butyl rubber latex (selected from butyl, bromobutyl and chlorobutyl latexes) | 100 |
| sulphur | 0.5 to 5.0 |
| zinc dibutyldithiocarbamate | 0.1 to 5.0 |
| zinc oxide | 3 to 8 |
| dithiocarbamate rubber accelerator | 0.1 to 5.0 |

A cotton knitted fabric glove blank was placed on a porcelain former, flamed to smooth off the surface and dipped into a coagulant bath. This consisted of a 10% acetic acid solution in acetone. The former was allowed to dry whilst being rotated for about 2½ minutes at room temperature (24° C.). The cotton blank was then dipped into a natural-rubber latex bath made up of a latex bath made up of a latex (LOTOL® 1185) and allowed to dwell 5 seconds. This was then withdrawn, inverted and allowed to dry. The natural rubber film was then scrubbed with an abrasive cleaner using a beaker brush and water and then rinsed and dried. This was then dipped into a bath of butyl-rubber latex made up of the following butyl rubber composition and withdrawn at 10 cm per minute and immediately rotated at about 8 rpm at 24° C. until the film had gelled. The film was then dried in an oven at 66° C. for 1 hour in the inverted position. The most preferred butyl rubber latex composition is as follows:

TABLE VII

| | PARTS BY DRY WEIGHT |
|---|---|
| Butyl latex 100 | 100.00 |
| Sulphur | 3.00 |
| Zinc dibutyldithiocarbamate | 4.00 |
| Zinc oxide | 5.00 |
| Formaldehyde (preservative) | 0.10 |
| Merac® 255 | 4.00 |
| Pigments to give Olive drab colour | 6.50 |

MERAC® 255 - a liquid dithiocarbamate rubber curing accelerator.

The washing and dipping procedures were repeated until five dip-coats of butyl-rubber latex had been applied although no abrasive cleaner was used on the butyl film. The finished product was then dried at 66° C. for 1 hour and cured in a pressure vessel under the following conditions (i) 30 psi steam in the jacket (131°

C.); (ii) 26 psi air in the curing chamber; (iii) 3 hours duration.

The above process enabled applicant to produce a good rubber glove with excellent flexibility and softness.

The quality i.e. evenness of the coatings and adhesion of the various coatings was found to be improved by scrubbing the surface of each dried coating prior to application of succeeding coatings.

Gloves made with the butyl rubber composition of Table VII were worn by military personnel while carrying out tasks in a field trial to determine performance and durability of the gloves when worn for a 24 hour period by persons engaged in driving and repairing motor vehicles, moving stores and equipment, field telephone maintenance, and lifting and carrying casualty loaded stretchers. When tested for H-agent resistance by applicant's penetration cell method, the worn gloves showed no penetration of H-agent during 24 hours of test.

Blends of butyl rubber with other polymers were tried and polymers of polyvinylidene chloride, polyvinylacetate, acrylonitrile, rubber latex and other butylrubber latexes were made up and evaluated for physical properties as well as improvement of dipping properties. However, no improvements were noted.

It will be appreciated that although the presently preferred synthetic rubber used in the outer layer is a butyl rubber, applicant also contemplates the use of other synthetic rubbers which have similar properties. For example, Viton ® which is a trademark for a series of fluoroelastomers based on the copolymer of vinylidene fluoride and hexafluoropropylene is contemplated in view of its resistance to a wide variety of toxic corrosive chemicals and solvents, radiation and nonflammability.

It will also be appreciated that while this specification has been directed specifically to the manufacture of CW gloves, other items of CW clothing such as mitts, boots, hats, trousers and smocks may be fabricated using the principles of the present invention. While it is preferred to perform the fabric substrate to the final form of the article of clothing so as to eliminate the problems associated with properly sealing all seams, it is possible to fabricate an article of clothing subsequent to coating of the substrate with the CW agent resisting materials provided care is taken to seal the seams and joins.

It is also to be noted that application of the impermeable layers has been described by reference to dipping process. It will be appreciated that the impermeable layers may also be applied by other known means such as by spraying, calendering and the like without departing from the scope of this invention.

What is claimed is:

1. A multi-layered article of clothing comprising, in combination, an inner layer of a resilient elastomer selected from the group consisting of natural rubber, polyacrylate, polybutadiene, styrene-butadiene copolymer, acrylonitrile-butadiene and polychloroprene and an outer layer of a butyl rubber completely covering and integral with the inner layer, said inner layer having a high affinity for a toxic chemical vapor and being impermeable to said toxic chemical vapor, and said outer butyl rubber layer being substantially impermeable to a toxic chemical liquid and having a low toxic chemical vapor permeability, thereby providing high resistance to toxic chemical in liquid and vapor form.

2. A article as defined in claim 1, wherein said inner layer is deposited from a latex.

3. An article as defined in claim 2, wherein the rubber latex is selected from the group consisting of natural and polychloroprene rubber latex.

4. An article as defined in claim 1, wherein the outer layer is deposited from a butyl rubber latex.

5. An article as defined in claim 4, wherein the butyl rubber latex is a dispersion in water of a butyl rubber composition consisting of:

| | PARTS BY DRY WEIGHT |
|---|---|
| butyl rubber latex | 100 |
| sulphur | 0.5 to 5.0 |
| zinc dibutyldithiocarbamate | 0.1 to 5.0 |
| zinc oxide | 3 to 8 |
| dithiocarbamate rubber accelerator | 0.1 to 5.0 |

6. An article as defined in claim 4 or 5, wherein the butyl rubber is selected from the group consisting of bromo-butyl rubber and chloro-butyl rubber.

7. An article as defined in claim 1, wherein the outer layer is deposited from a solution of said butyl rubber in a suitable volatile organic solvent.

8. An article as defined in claim 7, wherein said solution is a solution in xylene of a butyl rubber composition consisting of

| | PARTS BY DRY WEIGHT |
|---|---|
| butyl rubber | 100 |
| zinc oxide | 3 to 8 |
| stearic acid | 0.1 to 2.0 |
| antioxidant | 0.3 to 3.0 |
| coumarone-indene resin | 0 to 15.0 |
| magnesium silicate filler | 0 to 100 |
| zinc diethyl dithiocarbamate | 0.1 to 3.0 |

9. An article as defined in claim 8, wherein said butyl rubber is selected from bromo-butyl rubber and chloro-butyl rubber.

10. A multi-layered article of clothing comprising, in combination, a moisture absorptive reinforcing substrate, an inner layer of a resilient elastomer selected from the group consisting of natural rubber, polyacrylate, polybutadiene, styrene-butadiene copolymer, acrylonitrile-butadiene and polychloroprene, which elastomer adheres to but does not penetrate said substrate while substantially completely covering said substrate, and an outer layer of a butyl rubber substantially completely covering and integral with said inner layer, said inner layer having a high affinity for a toxic chemical vapor and being impermeable to said toxic chemical vapor, and said outer butyl rubber layer being substantially impermeable to a toxic chemical liquid and having a low toxic chemical vapor permeability, thereby providing high resistance to toxic chemicals in liquid and vapor form.

11. An article as defined in claim 10, wherein the substrate comprises a resilient fabric having stretch in two directions, precut and formed in the shape of a glove.

12. An article as defined in claim 11, wherein said fabric is a knitted cotton fabric having an interlocked structure.

13. An article as defined in claim 10, wherein said inner layer is deposited from a latex.

14. An article as defined in claim 13, wherein the latex is selected from the group consisting of natural and polychloroprene rubber latex.

15. An article as defined in claim 10, wherein the outer layer is deposited from a butyl rubber latex.

16. An article as defined in claim 15, wherein the butyl rubber latex is a dispersion in water of a butyl rubber composition consisting of

| | PARTS BY DRY WEIGHT |
|---|---|
| a butyl rubber | 100 |
| sulphur | 0.5 to 5.0 |
| zinc dibutyldithiocarbamate | 0.1 to 5.0 |
| zinc oxide | 3 to 8 |
| dithiocarbamate rubber accelerator | 0.1 to 5.0 |

17. An article as defined in claim 10, wherein the outer layer is deposited from a solution of said butyl rubber in a suitable volatile organic solvent, said butyl rubber having the composition

| | PARTS BY DRY WEIGHT |
|---|---|
| butyl rubber | 100 |
| zinc oxide | 3 to 8 |
| stearic acid | 0.1 to 2.0 |
| antioxidant | 0.1 to 3.0 |
| coumarone-indene resin | 0 to 15.0 |
| magnesium silicate filler | 0 to 100 |
| zinc diethyl dithiocarbamate | 0.1 to 3.0 |

18. An article as defined in claim 17, wherein said butyl rubber is selected from the group consisting of bromo-butyl rubber and chloro-butyl rubber.

19. An article as defined in claim 1, 16 or 17, wherein the thickness of said butyl rubber layer is about 0.03 inches.

* * * * *